United States Patent Office 2,899,325
Patented Aug. 11, 1959

2,899,325
COMPOSITION FOR BUILDING BLOCKS

Carl L. Kranz, Flint, and Theron A. Groner, Bellevue, Mich.

No Drawing. Application September 25, 1956
Serial No. 612,066

1 Claim. (Cl. 106—93)

The invention relates to compositions of building materials particularly a building material which may be readily molded into a building block.

With the new types of building construction it is common to build structures of cement blocks such that the cement block itself may form the finished surface. This construction has been utilized for some time in auxiliary buildings such as barns, warehouses, factories and garages where an attractive finish was not of prime importance. However, for use with occupied buildings, concrete blocks are usually faced with a more attractive finish such as wooden siding, paneling, etc., necessitating expensive finishing work. Further disadvantages in the use of concrete blocks stems from the fact that it is difficult to attach siding or other facing to the blocks because of the block's hard, brittle nature, and as concrete may "sweat" in some climates, difficulties arise when paint is directly applied to the inside of concrete blocks, such as blistering and peeling.

It is, thus, an object of the invention to produce a building composition which may be molded with the same equipment used with concrete blocks yet is of lighter weight than concrete blocks, may be directly painted or plastered and is easily worked.

A further object of the invention is to produce a moldable building composition which has a high insulating value, high strength, may be easily worked with ordinary hand tools, is sweat-proof, fire-proof and termite-proof.

Another object of the invention is to design a moldable building composition which may be used in place of cement blocks, is approximately the cost of such blocks yet will not expand or contract with humidity changes, and resists weathering, freezing and thawing.

These and other objects of the invention will become apparent from the following description and claim.

The basic materials of the composition are sawdust, sand and cement which provides the majority of bulk and strength to the material. Many of the outstanding characteristics of the material are furnished by an admix of finely powdered burned gypsum and powdered pine rosin which are mixed with the above basic materials.

A typical composition of the invention would be comprised of, by volume: 5 parts sawdust; 1 part sand; 1 part cement; .85 to 1.25 parts of finely powdered burnt gypsum and .15 to .25 part of powdered pine rosin.

The above materials are thoroughly mixed together and sufficient water is added to produce a stiff workable plastic mass. The plastic mass may be poured in a concrete block mold, vibrated, and compressed to a uniform density. The blocks are then steam cured or permitted to dry and after seasoning are ready for construction purposes.

As will be apparent, the above material requires no special equipment as regular cement mixers and block forming machines may be used to form the blocks. The above quantities have proven very satisfactory and provide a light weight building block which is used in the same manner as a concrete block.

The admix of burned powdered gypsum and powdered pine rosin acts as a filler, permitting the block to be sawed, drilled, nailed and screwed into, yet provides strength and high insulating qualities. The admix also functions as a preservative helping to maintain the blocks termite-proof, fire-proof and resistance to freezing, thawing and other temperature and humidity changes. Also, the block texture is such that paints and plasters readily adhere and the blocks have acoustical absorbtion characteristics serving to sound-proof structures constructed thereof.

As the materials of the blocks are inexpensive and available, the cost of the improved composition compares favorably with that of concrete blocks. However, with the improved weight, working, insulating, finish and other characteristics, a more economical and universal building block is obtained.

We claim:

A building block consisting essentially of, by volume, 5 parts sawdust, 1 part sand, 1 part cement, .85–1.25 parts burned gypsum in a powdered state and .15 to .25 part powdered pine rosin, mixed with water, cured and formed into a convenient building block configuration.

References Cited in the file of this patent

UNITED STATES PATENTS

| | | |
|---|---|---|
| 303,213 | Cooke | Aug. 5, 1884 |
| 784,318 | Gregg | Mar. 7, 1905 |
| 1,007,199 | Hermann | Oct. 31, 1911 |
| 1,521,813 | Hornstein | Jan. 6, 1925 |
| 2,491,487 | Faulwetter | Dec. 20, 1949 |

FOREIGN PATENTS

| | | |
|---|---|---|
| 163,731 | Great Britain | June 2, 1921 |
| 514,498 | Canada | July 12, 1955 |